United States Patent
Chang et al.

(10) Patent No.: US 8,304,100 B2
(45) Date of Patent: Nov. 6, 2012

(54) COATED GLASS AND METHOD FOR MAKING THE SAME

(75) Inventors: Hsin-Pei Chang, New Taipei (TW); Wen-Rong Chen, New Taipei (TW); Huann-Wu Chiang, New Taipei (TW); Cheng-Shi Chen, New Taipei (TW); Jia Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/170,945

(22) Filed: Jun. 28, 2011

(65) Prior Publication Data
US 2012/0189870 A1 Jul. 26, 2012

(30) Foreign Application Priority Data
Jan. 25, 2011 (CN) .......................... 2011 1 0027520

(51) Int. Cl.
*B32B 15/04* (2006.01)
*C23C 14/34* (2006.01)

(52) U.S. Cl. ........ 428/701; 428/432; 428/698; 428/702; 204/192.1

(58) Field of Classification Search .................. 428/426, 428/432, 433, 688, 689, 698, 699, 701, 702; 204/192.1, 192.15, 157.42
See application file for complete search history.

(56) References Cited

U.S. PATENT DOCUMENTS

| | | | | |
|---|---|---|---|---|
| 4,450,201 A | * | 5/1984 | Brill et al. | 428/336 |
| 4,534,841 A | * | 8/1985 | Hartig et al. | 204/192.26 |
| 4,861,669 A | * | 8/1989 | Gillery | 428/434 |
| 5,216,542 A | * | 6/1993 | Szczyrbowski et al. | 359/588 |
| 5,279,722 A | * | 1/1994 | Szczyrbowski et al. | 204/192.27 |
| 6,344,288 B1 | * | 2/2002 | Oyama et al. | 428/701 |
| 6,358,617 B1 | * | 3/2002 | Ohsaki et al. | 428/469 |
| 6,362,414 B1 | * | 3/2002 | Fujisawa et al. | 136/256 |
| 7,745,009 B2 | * | 6/2010 | Decroupet et al. | 428/432 |
| 8,017,244 B2 | * | 9/2011 | Hevesi | 428/432 |
| 2001/0002295 A1 | * | 5/2001 | Anderson et al. | 428/432 |
| 2001/0031365 A1 | * | 10/2001 | Anderson et al. | 428/432 |
| 2002/0102352 A1 | * | 8/2002 | Hartig et al. | 427/165 |
| 2003/0165693 A1 | * | 9/2003 | Hartig et al. | 428/426 |

(Continued)

FOREIGN PATENT DOCUMENTS
JP 200458592 * 2/2004

(Continued)

OTHER PUBLICATIONS

JP200458592, Englsih Machine translation.*

(Continued)

*Primary Examiner* — Jennifer McNeil
*Assistant Examiner* — Lauren Robinson
(74) *Attorney, Agent, or Firm* — Altis Law Group, Inc.

(57) ABSTRACT

A coated glass includes a glass substrate, a first titanium oxide layer, a silver layer, a titanium layer, a titanium nitrogen layer and a second titanium oxide. The first titanium oxide layer is formed on the glass substrate. The silver layer is formed on the first titanium oxide layer. The titanium layer is formed on the sliver layer. The titanium nitrogen layer is formed on the titanium layer, and the second titanium oxide layer is formed on the titanium nitrogen layer.

6 Claims, 2 Drawing Sheets

U.S. PATENT DOCUMENTS

| | | | |
|---|---|---|---|
| 2004/0071985 A1* | 4/2004 | Krisko et al. | 428/434 |
| 2004/0146721 A1* | 7/2004 | Hartig et al. | 428/432 |
| 2005/0191513 A1* | 9/2005 | Hartig et al. | 428/627 |
| 2006/0246300 A1* | 11/2006 | Hevesi | 428/432 |
| 2007/0248791 A1* | 10/2007 | Hartig | 428/98 |
| 2008/0070045 A1* | 3/2008 | Barton et al. | 428/433 |
| 2008/0187692 A1* | 8/2008 | Roquiny et al. | 428/34 |
| 2008/0199670 A1* | 8/2008 | Yaoita et al. | 428/213 |
| 2008/0268262 A1* | 10/2008 | Hartig et al. | 428/433 |
| 2009/0047466 A1* | 2/2009 | German et al. | 428/98 |
| 2009/0258222 A1* | 10/2009 | Roquiny et al. | 428/336 |
| 2010/0104840 A1* | 4/2010 | Blacker et al. | 428/216 |
| 2010/0167034 A1* | 7/2010 | Depauw et al. | 428/216 |
| 2011/0300319 A1* | 12/2011 | Reymond et al. | 428/34 |
| 2012/0189870 A1* | 7/2012 | Chang et al. | 428/623 |

FOREIGN PATENT DOCUMENTS

WO    WO-2010072973    *    7/2010

OTHER PUBLICATIONS

WO2010072973 English Machine translation.*

* cited by examiner

COATED GLASS AND METHOD FOR MAKING THE SAME

BACKGROUND

1. Technical Field

The present disclosure relates to coated glass, particularly to a coated glass having a high abrasion resistance property and a method for making the coated glass.

2. Description of Related Art

Coated low-emissivity glass has a low emissivity in the infrared wavelength range of the radiation spectrum, and has a high transmittance in the visible wavelength range. However, typical films or coatings deposited by vacuum deposition have a low abrasion resistance.

Therefore, there is room for improvement within the art.

BRIEF DESCRIPTION OF THE FIGURE

Many aspects of the coated glass can be better understood with reference to the following figures. The components in the figures are not necessarily drawn to scale, the emphasis instead being placed upon clearly illustrating the principles of the coated glass.

DETAILED DESCRIPTION

Figure 1:
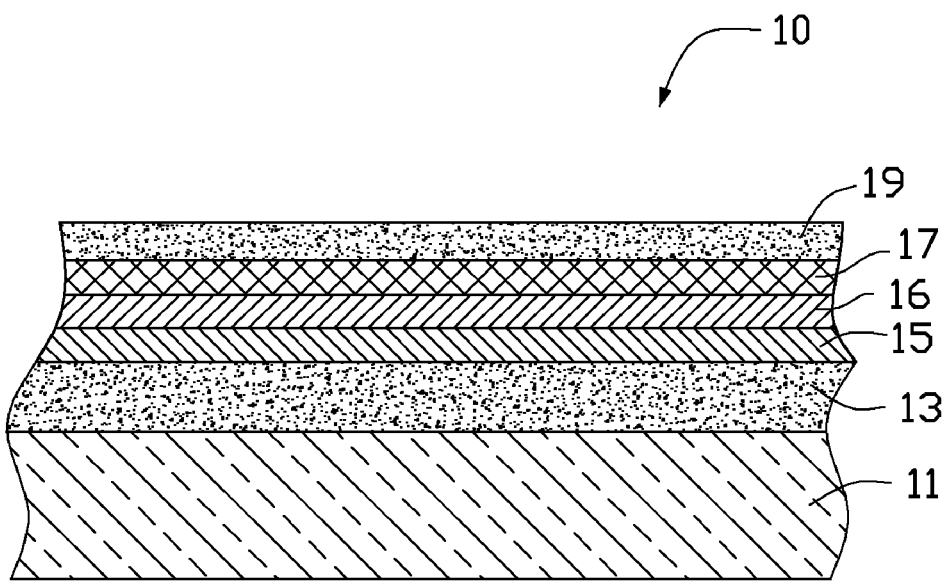
FIG. 1 illustrates a cross-sectional view of an exemplary embodiment of coated glass.

FIG. 1 shows coated glass 10 according to an exemplary embodiment. The coated glass 10 includes a glass substrate 11, a first titanium oxide layer 13, a silver layer 15, a titanium layer 16, a titanium nitrogen 17 and a second titanium oxide layer 19.

The first titanium oxide layer 13 is directly formed on the glass substrate 11, and has a thickness of about 200 nm to about 400 nm. Ti—O bonding in the first titanium oxide layer 13 and Si—O bonding in the glass substrate 11 may form Ti—O—Si chemical bonds to greatly improve the binding force between the first titanium oxide layer 13 and the glass substrate 11.

The silver layer 15 is formed on the first titanium oxide layer 13, and has a lower emissivity property in the infrared wavelength range in the radiation spectrum. The silver layer 15 has a thickness of about 15 nm to about 25 nm.

The titanium layer 16 is formed on the silver layer 15. The titanium layer 16 may protect the silver layer 15 and prevent the silver layer 15 from oxidization. The titanium layer 16 has a thickness of about 10 nm to about 20 nm.

The titanium nitrogen layer 17 is formed on the titanium layer 16. The titanium layer 16 has high hardness and may affect the hardness and abrasion of the coated glass 10. The titanium nitrogen layer 17 has a thickness of about 200 nm to about 300 nm.

The second titanium oxide layer 19 is formed on the titanium nitrogen layer 17. The second titanium oxide layer 19 has a thickness of about 200 nm to about 400 nm.

A method for making the coated glass 10 may include the following steps:

The substrate 11 is pretreated. The pre-treating process may include the following steps:

The substrate 11 is cleaned in an ultrasonic cleaning device (not shown), to remove impurities and contaminations, such as grease, or dirt.

Figure 2:
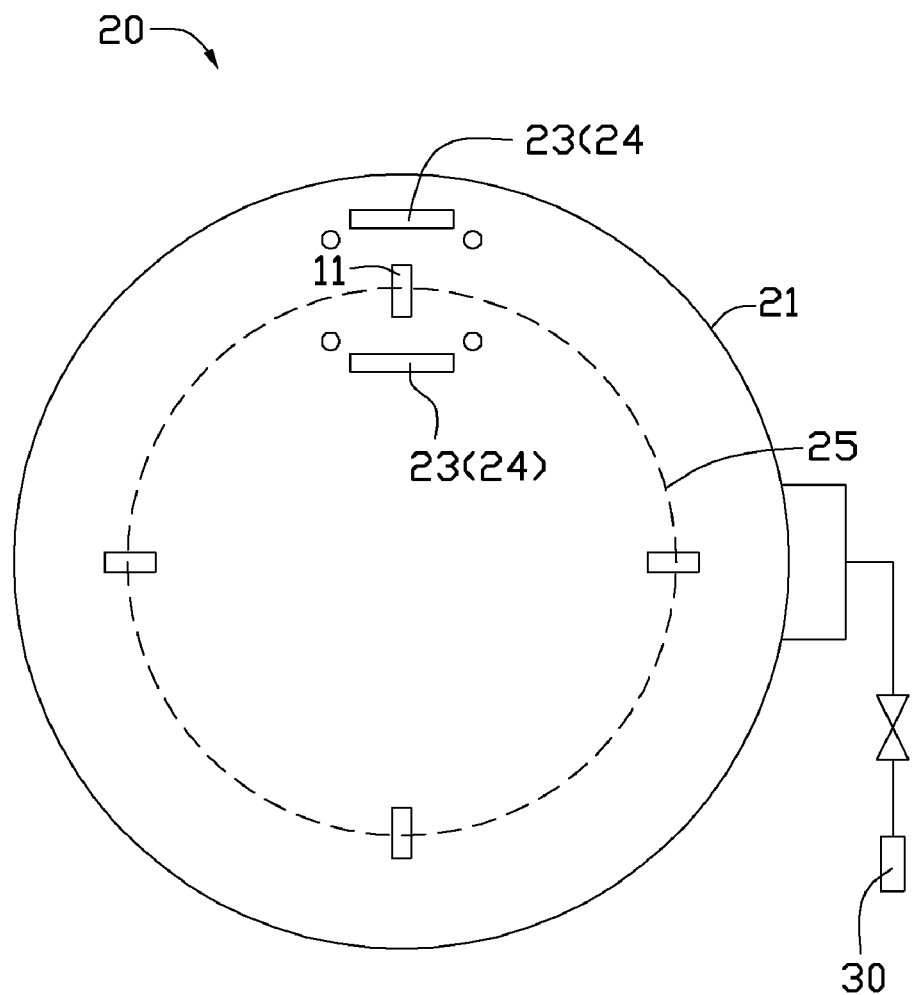
FIG. 2 is a schematic view of a magnetron sputtering coating machine for manufacturing the glass in FIG. 1.

Referring to FIG. 2, the substrate 11 is positioned in a plating chamber 21 of a vacuum sputtering machine 20. A titanium target 23 and a silver target 24 are fixed in the plating chamber 21. The substrate 11 is plasma cleaned. The plasma cleaning process makes the substrate 11 form a coarse or rugged surface for enhance the bond between the substrate 11 and the layer on the substrate 11.

The first titanium oxide layer 13 is vacuum sputtered on the substrate 11. During the process, the titanium target 23 is applied at a power of about 3 kw to about 4 kw. The inside of the plating chamber 21 is heated from about 100° C. to about 200° C. Argon (Ar) is used as a working gas is fed into the chamber 21 at a flow rate of about 300 sccm to about 350 sccm. Oxygen ($O_2$) is used as reaction gas and fed into the chamber 21 at a flow rate of about 55 sccm to about 90 sccm. The substrate 11 may be biased with negative bias voltage of about −100 V to about −150 V to deposit the coating 13 on the substrate 11. Depositing of the coating 13 may take from about 20 to about 50 minutes.

The silver layer 15 is formed on the first titanium oxide layer 13 by sputtering. During the process, the silver target 24 is applied with a power of about 2 kw to about 2.8 kw. The inside of the plating chamber 21 is heated from about 80° C. to about 120° C. Argon (Ar) is used as a working gas is fed into the chamber 21 at a flow rate of about 300 sccm to about 350 sccm. The substrate 11 may be biased with negative bias voltage of about −100 V to about −120 V to deposit silver on the substrate 11. Depositing of the silver layer 15 may take about 3-5 minutes.

The titanium layer 16 is formed on the silver layer 15 by sputtering. During the process, the titanium target 24 is applied to at a power of about 2 kw to about 2.8 kw. The inside of the plating chamber 21 is heated from about 100° C. to about 200° C. Argon (Ar) is used as a working gas is fed into the chamber 21 at a flow rate of about 300 sccm to about 350 sccm. The substrate 11 may be biased with negative bias voltage of about −100 V to about −120 V to deposit silver on the substrate 11. Depositing of the titanium layer 16 may take about 3-5 minutes.

The titanium nitrogen layer 17 is formed on the titanium layer 16. Nitrogen is fed into the chamber 21, and is sputtered on the titanium target 24 to form the titanium nitrogen layer 17 on the titanium layer 16. During the process, the titanium target 23 is applied at a power of about 2.5 kw to about 3.5 kw. The inside of the plating chamber 21 is heated from about 100° C. to about 150° C. Argon (Ar) is used as a working gas is fed into the chamber 21 at a flow rate of about 300 sccm to about 350 sccm. The substrate 11 may be biased with negative bias voltage of about −100 V to about −120 V to deposit silver on the substrate 11. Nitrogen is used as a reaction gas and is fed into the chamber 21 at a flow rate of about 60 sccm to about 80 sccm. Depositing of the titanium nitrogen layer 17 may take from about 20 to about 50 minutes. Alternatively, nitrogen may be replaced with alkaline air. The alkaline air may be fed at a flow rate of about 50 sccm to 80 sccm.

Oxygen is fed into the chamber 21, and is sputtered on the titanium target 23 to form the second titanium oxide layer 19 on the titanium nitrogen layer 17. The parameters of forming the second titanium oxide layer 19 is similar to the first titanium oxide layer 13, and herein is not described.

The present disclosure is described further in detail using examples as follows, but is not limited by the following examples. In the following examples, the pretreated process for the substrate 11 is similar, and herein is not repeated.

Example I

The glass substrate 11 is provided. The substrate 11 is cleaned in an ultrasonic cleaning device (not shown), which is filled with ethanol or acetone. The cleaning time is about 5 min.

The substrate 11 is plasma cleaned. Referring to FIG. 2, the substrate 11 is positioned in a plating chamber 21 of a vacuum sputtering machine 20. The plating chamber 21 is then evacuated to about $5.0 \times 10^{-3}$ Pa. Argon (Ar) may be used as a working gas and fed into the chamber 21 at a flow rate from about 200 standard cubic centimeter per minute (sccm). The substrate 11 may be biased with negative bias voltage of −200 V, then high-frequency voltage is produced in the plating chamber 21 and the Ar is ionized to plasma. The plasma then strikes the surface of the substrate 11 to clean the surface of the substrate 11. Plasma cleaning the substrate 11 may take about 10 minutes. The plasma cleaning process makes the substrate 11 form a coarse or rugged surface for enhance the bond between the substrate 11 and the layer on the substrate 11.

The first titanium oxide layer 13 is vacuum sputtered on the substrate 11. The titanium target 23 is applied at a power of about 3 kw. The inside of the plating chamber 21 is heated to about 150° C. Ar as a working gas is fed into the chamber 21 at a flow rate of about 300 sccm. $O_2$ is used as reaction gas and is fed into the chamber 21 at a flow rate of about 60 sccm. The substrate 11 may be biased with negative bias voltage of about −100 V to deposit the first titanium oxide layer 13 on the substrate 11. Depositing of the coating 13 may take about 20 minutes.

The silver layer 15 is formed on the first titanium oxide layer 13 by sputtering. The silver target 24 is applied to at a power of about 2 kw. The inside of the plating chamber 21 is heated from about 100° C. Ar as a working gas is fed into the chamber 21 at a flow rate of about 300 sccm. The substrate 11 may be biased with negative bias voltage of about −100 V to deposit silver on the first titanium oxide layer 13 of the substrate 11. Depositing of the silver layer 15 may take about 5 minutes.

The titanium layer 16 is formed on the silver layer 15 by sputtering. The titanium target 24 is applied with a power of about 2.5 kw. The inside of the plating chamber 21 is heated to about 150° C. Ar as a working gas is fed into the chamber 21 at a flow rate of about 300 sccm. The substrate 11 may be biased with negative bias voltage of about −100 V to about −120 V to deposit silver on the substrate 11. Depositing of the titanium layer 16 may take about 5 minutes.

The titanium nitrogen layer 17 is formed on the titanium layer 16. During the process, the titanium target 23 is applied at a power of about 3.5 kw. The inside of the plating chamber 21 is heated to about 150° C. Ar as a working gas is fed into the chamber 21 at a flow rate of about 300 sccm. The substrate 11 may be biased with negative bias voltage of about −100 V to deposit titanium nitrogen layer 17 on the substrate 11. Nitrogen is used as reaction gas and is fed into the chamber 21 at a flow rate of about 60 sccm. Depositing of the titanium nitrogen layer 17 may take about 20 minutes.

Oxygen is fed into the chamber 21, and sputters the titanium target 23 to form the second titanium oxide layer 19 on the titanium nitrogen layer 17. $O_2$ is used as reaction gas and is fed into the chamber 21 at a flow rate of about 60 sccm. Depositing of the second titanium oxide layer 19 may take about 20 minutes.

The first titanium oxide layer 13 of the coated glass in the first exemplary embodiment has a thickness of about 237 nm. The silver layer 15 has a thickness of about 16 nm. The titanium layer 16 has a thickness of about 11 nm. The titanium nitrogen layer 17 has a thickness of about 226 nm. The second titanium oxide layer 19 has a thickness of about 237 nm.

Example II

The glass substrate 11 is provided. The substrate 11 is cleaned in an ultrasonic cleaning device (not shown), which is filled with ethanol or acetone. The clean time is about 10 min.

The substrate 11 is plasma cleaned. Referring to FIG. 2, the substrate 11 is positioned in a plating chamber 21 of a vacuum sputtering machine 20. The plating chamber 21 is then evacuated to about $5.0 \times 10^{-3}$ Pa. Ar may be used as a working gas and be fed into the chamber 21 at a flow rate of about 400 sccm. The substrate 11 may be biased with negative bias voltage of −300 V, then high-frequency voltage is produced in the plating chamber 21 and the Ar is ionized to plasma. The plasma then strikes the surface of the substrate 11 to clean the surface of the substrate 11. Plasma cleaning the substrate 11 may take about 10 minutes. The plasma cleaning process makes the substrate 11 form a coarse or rugged surface for enhancing the bond between the substrate 11 and the layer on the substrate 11.

The first titanium oxide layer 13 is vacuum sputtered on the substrate 11. The titanium target 23 is applied to at a power of about 3 kw. The inside of the plating chamber 21 is heated to about 200° C. Ar as a working gas is fed into the chamber 21 at a flow rate of about 300 sccm. $O_2$ is used as reaction gas and is fed into the chamber 21 at a flow rate of about 60 sccm. The substrate 11 may be biased with negative bias voltage of about −100 V to deposit the first titanium oxide layer 13 on the substrate 11. Depositing of the coating 13 may take about 45 minutes.

The silver layer 15 is formed on the first titanium oxide layer 13 by sputtering. The silver target 24 is applied to at a power of about 2.5 kw. The inside of the plating chamber 21 is heated from about 100° C. Ar as a working gas is fed into the chamber 21 at a flow rate of about 300 sccm. The substrate 11 may be biased with negative bias voltage of about −100 V to deposit silver on the first titanium oxide layer 13 of the substrate 11. Depositing of the silver layer 15 may take about 5 minutes.

The titanium layer 16 is formed on the silver layer 15 by sputtering. The titanium target 24 is applied to at a power of about 2.5 kw. The inside of the plating chamber 21 is heated to about 200° C. Ar as a working gas is fed into the chamber 21 at a flow rate of about 300 sccm. The substrate 11 may be biased with negative bias voltage of about −100 V to deposit silver on the substrate 11. Depositing of the titanium layer 16 may take about 5 minutes.

The titanium nitrogen layer 17 is formed on the titanium layer 16. During the process, the titanium target 23 is applied at a power of about 3.5 kw. The inside of the plating chamber 21 is heated to about 200° C. Ar as a working gas is fed into the chamber 21 at a flow rate of about 300 sccm. The substrate 11 may be biased with negative bias voltage of about −100 V to deposit titanium nitrogen layer 17 on the substrate 11. Nitrogen is used as reaction gas and is fed into the chamber 21 at a flow rate of about 80 sccm. Depositing of the titanium nitrogen layer 17 may take about 45 minutes.

Oxygen is fed into the chamber 21, and sputters the titanium target 23 to form the second titanium oxide layer 19 on the titanium nitrogen layer 17. $O_2$ is used as reaction gas and is fed into the chamber 21 at a flow rate of about 60 sccm. Depositing of the second titanium oxide layer 19 may take about 30 minutes.

The first titanium oxide layer 13 of the coated glass in the second exemplary embodiment has a thickness of about 388 nm. The silver layer 15 has a thickness of about 23 nm. The titanium layer 16 has a thickness of about 17 nm. The titanium nitrogen layer 17 has a thickness of about 269 nm. The second titanium oxide layer 19 has a thickness of about 388 nm.

A third exemplary embodiment is similar to the first exemplary embodiment, and the difference is that nitrogen is replaced with alkaline air. The alkaline air is fed at a flow rate of about 40 sccm. From this embodiment, the first titanium oxide layer 13 of the coated glass in the first exemplary embodiment has a thickness of about 234 nm. The silver layer 15 has a thickness of about 23 nm. The titanium layer 16 has a thickness of about 16 nm. The titanium nitrogen layer 17 has a thickness of about 273 nm. The second titanium oxide layer 19 has a thickness of about 385 nm.

A fourth exemplary embodiment is similar to the second exemplary embodiment, and the difference is that nitrogen is replaced with alkaline air. The alkaline air is at a flow rate of about 65 sccm. From this embodiment, the first titanium oxide layer 13 of the coated glass in the first exemplary embodiment has a thickness of about 383 nm. The silver layer 15 has a thickness of about 23 nm. The titanium layer 16 has a thickness of about 16 nm. The titanium nitrogen layer 17 has a thickness of about 273 nm. The second titanium oxide layer 19 has a thickness of about 385 nm.

Forming the second titanium oxide layer 19 may adopt other ways. For example, the time of depositing of the titanium nitrogen layer 17 may be prolonged about 20 minutes to about 30 minutes. Then, the substrate with the titanium nitrogen layer 17 is put into a furnace to heat at about 300° C. to about 400° C., and is maintained for about 15 minutes to about 30 minutes to form the second titanium oxide layer 19.

The first titanium oxide layer 13 and the glass substrate 11 may form Ti—O—Si chemical bonds therebetween to greatly improve the binding force between the first titanium oxide layer 13 and the glass substrate 11.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A coated glass, comprising:
a glass substrate;
a first titanium oxide layer formed on the glass substrate wherein the first titanium oxide layer has a thickness of about 200 nm to about 400 nm;
a silver layer form on the first titanium oxide layer;
a titanium layer formed on the silver layer;
a titanium nitrogen layer formed on the titanium layer wherein the titanium nitrogen layer has a thickness of about 200 nm to about 300 nm; and
a second titanium oxide layer formed on the titanium nitrogen layer wherein the second titanium oxide layer has a thickness of about 200 nm to about 400 nm.

2. The coated glass as claimed in claim 1, the silver layer has a thickness of about 15 nm to about 25 nm, and the titanium layer has a thickness of about 10 nm to about 20 nm.

3. A method for manufacturing a coated glass comprising steps of:
providing a substrate;
providing a vacuum sputtering coating machine comprising a plating chamber, a titanium target and a silver target located in the plating chamber;
opening the titanium target to form a first titanium oxide layer on the substrate wherein the first titanium oxide layer has a thickness of about 200 nm to about 400 nm;
opening the silver target to form a silver layer on the first titanium oxide layer;
opening the titanium target to for a titanium layer on the silver layer;
filling nitrogen into the plating chamber to form a titanium nitrogen layer on the titanium layer wherein the titanium nitrogen layer has a thickness of about 200 nm to about 300 nm;
forming a second titanium oxide layer on the titanium nitrogen layer wherein the second titanium oxide layer has a thickness of about 200 nm to about 400 nm.

4. The method as claimed in claim 3, wherein vacuum sputtering the coating use Argon which is fed at a flow rate of about 300 to about 400 sccm, oxygen is fed at a flow rate of about 50 sccm to about 88 sccm, power of about 5 kw to about 7 kw is applied to the first target, and the substrate is biased with negative bias voltage of about −100 V to about −150 V, and depositing of the first titanium oxide layer and the second titanium oxide layer respectively take about 30-60 minutes.

5. The method as claimed in claim 4, further comprising a step of pre-treating the substrate before forming the first titanium oxide layer.

6. The method as claimed in claim 5, wherein the pre-treating process comprising ultrasonic cleaning the substrate and plasma cleaning the substrate.

* * * * *